Aug. 29, 1933.   A. H. MITCHELL   1,924,797
MOTOR VEHICLE
Filed April 29, 1932   2 Sheets-Sheet 1
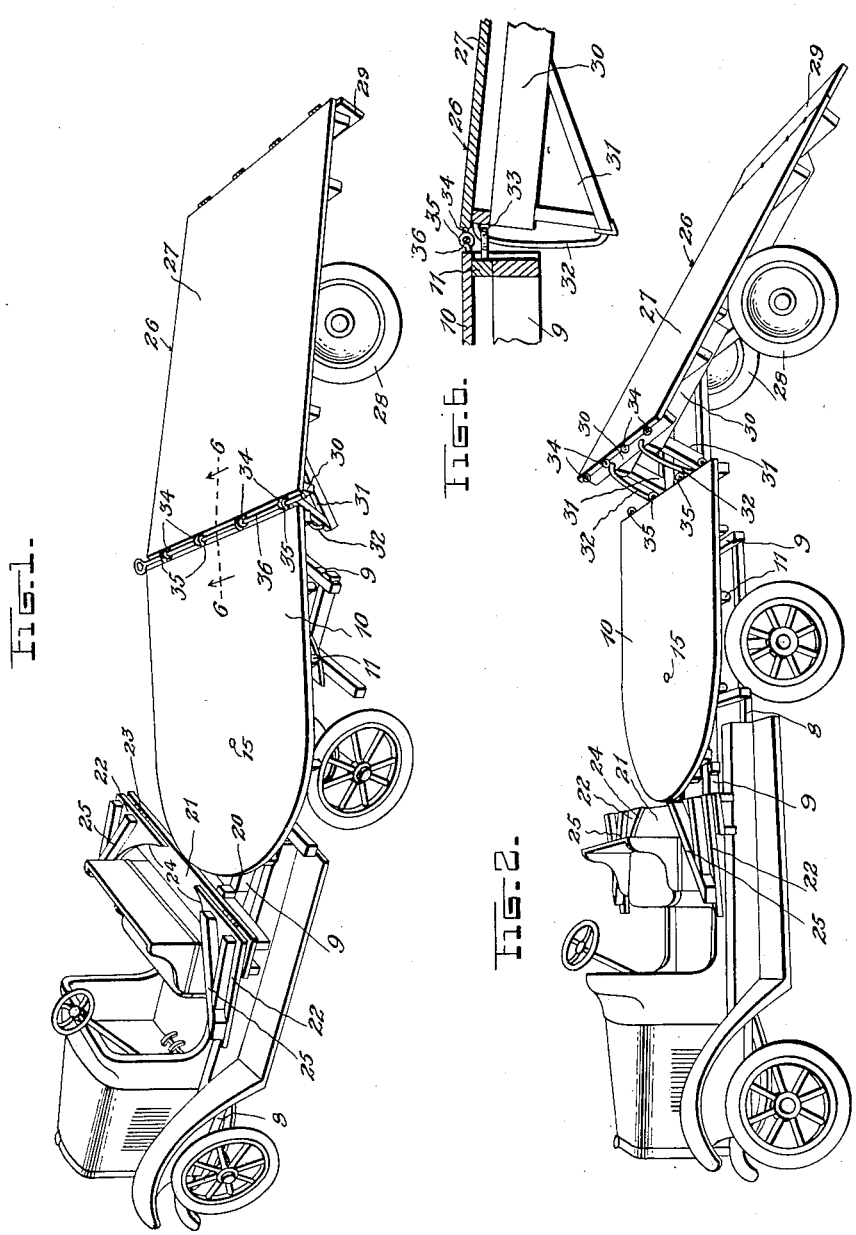
Inventor
A. H. Mitchell
Witness
C. Hunt
By H. B. Willson & Co.
Attorneys.

Aug. 29, 1933.    A. H. MITCHELL    1,924,797
MOTOR VEHICLE
Filed April 29, 1932    2 Sheets-Sheet 2

Inventor
A. H. Mitchell
By H. B. Willson & Co.
Attorneys.

Witness

Patented Aug. 29, 1933

1,924,797

UNITED STATES PATENT OFFICE 1,924,797

MOTOR VEHICLE

Archelus H. Mitchell, Selma, Ala.

Application April 29, 1932. Serial No. 608,317

3 Claims. (Cl. 296—1)

The invention relates to a new and improved vehicle (preferably motor driven) which may be used as an ordinary truck for relatively small loads and may be materially increased in carrying capacity, for larger loads. A platform is mounted on a conventional truck chassis, and a platform of a two-wheeled trailer may be connected with the rear end of the truck platform. This truck platform is mounted to turn about a vertical axis and necessarily so turns when rounding curves with the trailer in use, but an object of the invention is to provide novel means for normally holding said truck platform against turning whenever the trailer is not in use, it being possible however to turn said truck platform if such turning be desired, for instance, to facilitate movement of a load transversely of the truck, onto or from the platform, instead of moving the load forwardly onto the platform or rearwardly from the latter.

A still further aim is the provision of a truck platform embodying main and auxiliary sections, in which abutting of said sections normally holds the main or turnable section against turning and in which such relative movement of said sections may be effected, as to discontinue their abutting relation and allow turning of said main section.

Still another object is to provide a truck platform of the nature above explained, which embodies a fixed transverse auxiliary section on which a power take-off hoist, a power driven hoist, or a hand power hoist, may be mounted for loading and unloading purposes.

While truck and trailer "platforms" are herein described and illustrated, obviously sides, stakes, etc., could be used on them. Therefore, "platforms" is not to be considered as limiting to platforms devoid of sides, stakes or the like.

With the foregoing objects in view, the invention resides in the novel subject matter hereinafter described and claimed, description being accomplished by reference to the accompanying drawings.

Fig. 1 is a perspective view showing the truck and trailer platforms operatively connected and illustrating said platforms turned with respect to the truck chassis.

Fig. 2 is a perspective view illustrating the manner in which the trailer platform may be downwardly tilted at its rear end to facilitate loading or unloading.

Fig. 6 is a detail sectional view on line 6—6 of Fig. 1.

Figure 3:
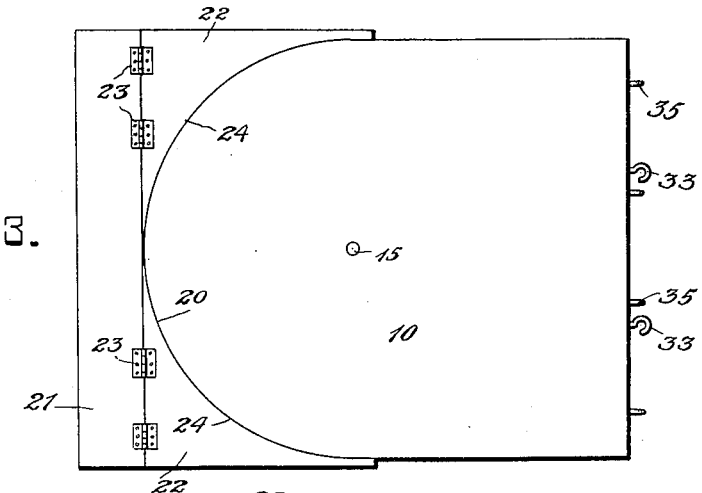
Fig. 3 is a top plan view of the truck with the trailer removed, showing the turnable main section of the truck platform held against turning by its abutting relation with auxiliary platform sections which are shown in inoperative positions in Figs. 1 and 2.
Figure 4:
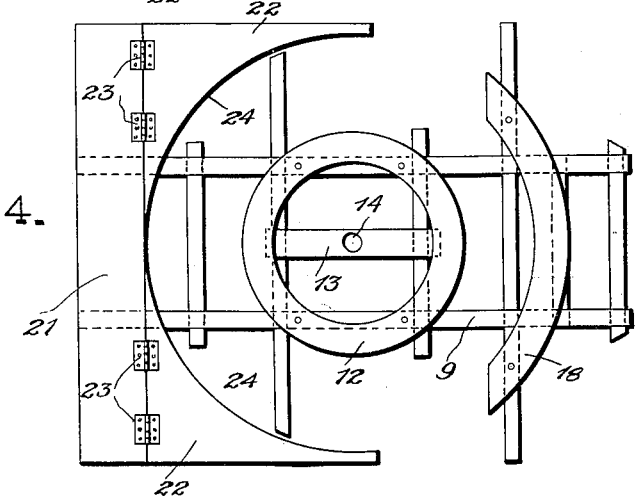
Fig. 4 is a top plan view of the truck with the main platform section removed.
Figure 5:
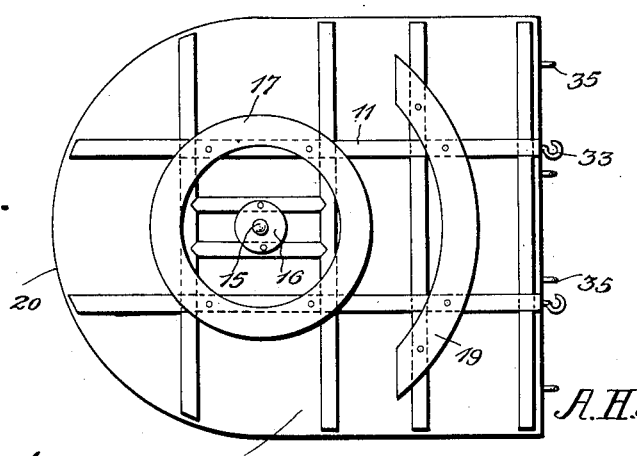
Fig. 5 is a bottom plan view of the main platform section of the truck.

Sufficient disclosure of the invention has been given to enable others skilled in the art to clearly understand all fundamentals involved, but it is to be understood that the invention is not restricted to the details disclosed.

Upon a conventional motor truck chassis 8, I mount a sectional truck platform which embodies an appropriate sub-frame 9 suitably secured to the chassis frame. Upon the frame 9, I mount a main platform section 10 so that it may be turned about a vertical axis, and said main platform section 10 preferably includes a sub-frame 11 upon which the floor boards, plates or the like are secured. While any desired means may be employed for rotatably mounting the platform section 10, I prefer to use a construction equivalent to that shown.

A circular track 12 is secured upon the frame 9 and is spanned by a bridge bar 13 having an opening 14. This opening receives a king pin 15 which is rigidly secured to and projects downwardly from the frame 11 of the platform section 10. Surrounding the upper end or joined to said upper end of the king pin 15, is a bearing plate 16 which rests upon the bridge bar 13, and spaced outwardly from said king pin, is an annular track 17 which rests upon the track 12. Ball or roller bearings could of course be associated with any of these features of construction, to facilitate easy turning of the platform section 11.

Any desired provision may be made to prevent tilting of the platform section 10, and for illustrative purposes, I have shown tracks 18 and 19 secured to the frames 9 and 11 respectively, said tracks being behind the tracks 12 and 17 and contacting with each other.

The platform section 10 is provided with a curved front edge 20 which is preferably concentric with the king pin 15. The front extremity of this edge 20 is disposed at the rear edge of a fixed auxiliary platform section 21 which is rigidly mounted upon the frame 9 directly behind the cab or driver's seat of the truck chassis, said section 21 being well adapted for mounting a hoist to facilitate loading and unloading. Two additional auxiliary platform sections 22 of substantially triangular form, are provided to fill the gaps between the section 21 and the curved edge 20 of the main section 10 whenever desired. In the present showing, these sections 22 are hinged at 23 to the section 21 so that they may either occupy the operative positions shown in Fig. 3, or the inoperative positions disclosed in Figs. 1 and 2. Each of the sections 22 is formed with a curved inner edge 24 to abut the curved edge 20 of the main platform section 10, and each of said sections embodies a sub-frame 25 to rest on the main frame 9. The shape of the sections 22 is such that when they are horizontal as shown in Fig. 3 and abutting the main platform section 10, they hold the latter against turning about the king pin 15. When the sections 24 are folded forwardly however, as seen in Figs. 1 and 2, they allow turning of the main platform section 10.

A two-wheeled trailer 26 is shown for use with the truck when relatively large loads are to be hauled. This trailer is provided with a platform 27 and the trailer wheels 28 are between the front and rear ends of said platform, so that the latter may be downwardly tilted at its rear end as seen in Fig. 2, to facilitate loading or unloading. When the platform 27 is connected with the main platform section 10 of the truck, and is tilted to the position shown in Fig. 2, a load may be slid (or driven if a tractor or the like) up the inclined platform 27 until said load passes the center of gravity, whereupon said platform will tilt to the position illustrated in Fig. 1, allowing the load to be advanced onto the main section 10 of the truck platform. Then, if necessary or desirable, the trailer platform may be loaded in the same way. To facilitate loading, a short ramp 29 is shown hinged to the rear end of the platform 27.

In the present showing, the platform 27 embodies a sub-frame 30 provided at its front end with two downwardly projecting V-shaped frames 31, said V-shaped frames being disposed in parallel vertical planes extending longitudinally of the trailer. Two substantially vertical but arcuate tracks 32 are disposed in front of the frames 31, tracks 32 being rigidly secured at their lower ends to said frames 31 and rigidly secured at their upper ends to the sub-frame 30. These tracks 32 are engageable with open eyes, hooks or the like 33 carried by the rear end of the sub-frame 11 of the main truck platform section 10, and when the two platforms (truck and trailer) are connected by means of the parts 32 and 33, tilting of the platform 27 is permitted, as shown in Fig. 2, for the purposes above explained. The connecting means 32—33, also allows quick and easy disconnection of the trailer 26 from the truck, when the latter is to be used independently of the former.

When the trailer is being used, in order to hold its platform 27 normally against tilting, eyes 34 on the front end of the platform 27 are alined with eyes 35 on the rear end of the platform section 10, and a rod 36 is passed through said eyes, any desired means being employed to hold said rod against accidental removal. This rod and the eyes 34 and 35, also constitute a transverse hinge which allows the necessary flexibility between truck and trailer when traveling over convex or concave surfaces.

When small loads are to be hauled, the truck is used independently of the trailer, the main platform section 10 being then held against turning about its pivot, by the auxiliary sections 22, as shown in Fig. 3. Should it be desired to turn this platform section 10 however, for instance to facilitate loading or unloading, the auxiliary sections 22 may be swung forwardly, thereby allowing such turning.

When larger loads are to be hauled, the trailer is coupled onto the platform section 10 as seen in Figs. 1 and 2, the auxiliary sections 22 being swung forwardly to allow the connected platforms 10 and 27 to turn with respect to the truck chassis. Whenever desired, for easy loading or unloading, the trailer platform 27 may be tilted as shown in Fig. 2.

Excellent results are obtainable from the general structure shown and described, and it may therefore be followed if desired. However, attention is again invited to the fact that variations may be made within the scope of the invention as claimed.

I claim:—

1. A truck platform embodying main and auxiliary platform sections normally abutting each other, the latter being manually movable from contact with the former, and means mounting said main platform section for turning about a vertical axis, such turning being normally prevented by the abutting relation of said main and auxiliary platform sections, said main and auxiliary platform sections normally lying in a single plane to jointly form the platform.

2. A truck platform embodying main and auxiliary platform sections normally abutting each other, the latter being hinged for movement from contact with the former, and means mounting said main platform section for turning about a vertical axis, such turning being normally prevented by the abutting relation of said main and auxiliary platform sections, said main and auxiliary platform sections normally lying in a single plane to jointly form the platform.

3. A truck platform comprising a main section and means mounting it for turning about a vertical axis, said main section having a curved front edge, an auxiliary front section fixedly secured and extending transversely at the front end of said main section, two additional auxiliary sections filling the spaces between said fixed front section and the curved front edge of said main section, and hinges connecting said two auxiliary sections with said front section and allowing upward swinging of the former.

ARCHELUS H. MITCHELL.